H. FRANKEL.
SPLICING SLEEVE.
APPLICATION FILED NOV. 27 1908.
922,690. Patented May 25, 1909.
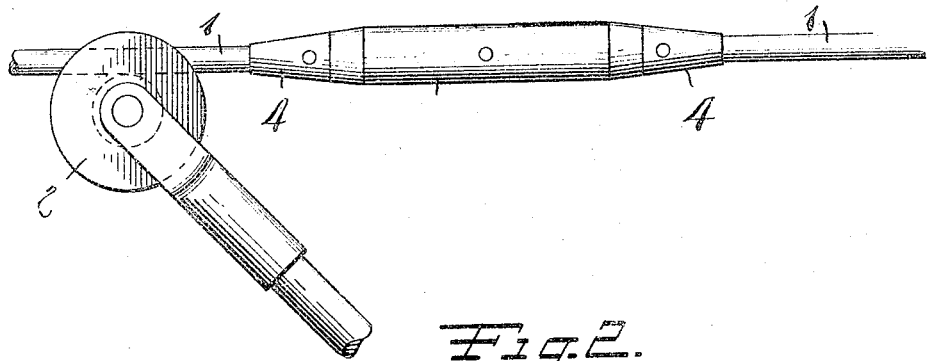
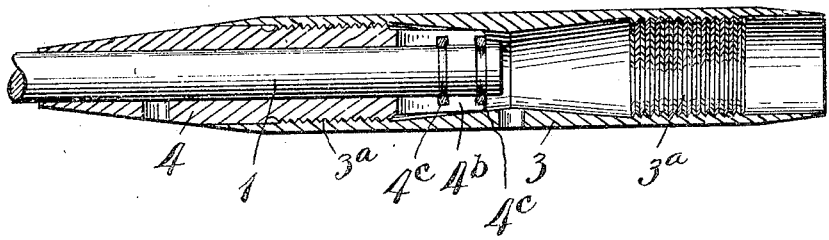
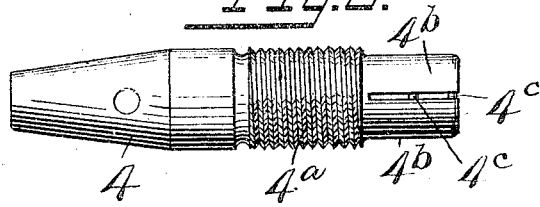 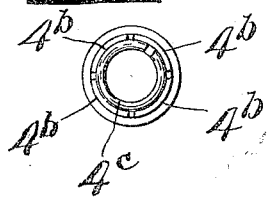
Witnesses:
Chas. W. Beard
Fred M. Dannenfelser
Inventor
Harry Frankel
By his Attorneys
Bauer, Bonner & Mulder

UNITED STATES PATENT OFFICE.

HARRY FRANKEL, OF NEW YORK, N. Y.

SPLICING-SLEEVE.

No. 922,690.   Specification of Letters Patent.   Patented May 25, 1909.

Application filed November 27, 1908. Serial No. 464,777.

*To all whom it may concern:*

Be it known that I, HARRY FRANKEL, a citizen of the United States, residing in the city, county, and State of New York, have invented certain new and useful Improvements in Splicing-Sleeves, of which the following is a full, clear, and exact description.

My invention relates to improvements in splicing sleeves for wires and the like, and is particularly useful when employed for the purpose of mending broken trolley wires.

This invention is essentially an improvement upon the splicing sleeve made the subject matter of my former patent No. 861,717 of July 30, 1907, and consists broadly in improved means for clenching the splicing member upon the wire ends so as to resist to the utmost degree any slippage between the parts.

In the drawings, Figure 1 represents my invention as applied to a broken trolley wire, said view being a side elevation and showing an approaching trolley wheel. Fig. 2 is a relatively enlarged longitudinal section, one end of the splicing sleeve and trolley wire being removed. Fig. 3 is a side elevation of one of the parts detached. Fig. 4 is an end view of the parts shown in Fig. 3 looking from right to left. Fig. 5 is a view of another detail of construction detached.

1—1 represents two ends of a trolley wire. 2 represents a trolley wheel bearing against the wire in the usual manner. In Fig. 1 the splicing sleeve is shown in place, holding the two wire ends in secure embrace. The splicing sleeve comprises the main body 3 of tubular form, the passage therethrough being arranged to receive the two end pieces 4—4 which constitute the clamping members. Each end piece 4 has external screw threads $4^a$. The bore of the main body of the sleeve is threaded at $3^a$ to receive the threaded portion of each clamping sleeve. Beyond the threaded portion the bore is somewhat contracted or inclined to form a bearing surface to receive the jaws $4^b$—$4^b$ of the sleeve so that when said sleeve is screwed in, said jaws will be drawn toward each other.

$4^c$—$4^c$ are split rings arranged within the jaws $4^b$—$4^b$ and around the passage therethrough, the function of each of said split rings being to cut transversely into the metal of the wire end standing within the clamping member. Any desired number of these split rings may be employed to guarantee against all possibility of any strain that would occur in use. The inner wall of each jaw is slightly recessed so as to afford a seat for each split ring $4^c$—$4^c$.

From the foregoing it follows that when the end of a wire is slipped through a clamping member and through the split rings carried by the jaws thereof, the user has but to rotate the parts so as to draw the clamping member into the sleeve, whereupon the jaws $4^b$ will be contracted and the retaining device or devices $4^c$ will be caused thereby to cut or score into the surface of the wire to be held, thereby interlocking the parts, thus supplementing the frictional clamping action of the jaws to such an extent as to make a joint of the greatest possible strain resisting capacity.

The ends of the sleeve and each clutch member should be appropriately formed, as by a taper in the present instance, since it is necessary for the proper guidance of the trolley wheel that an easy incline be afforded across which said wheel must travel.

As in my former patent, any suitable tool may be employed for rotating the several parts during the turning up operation. It may here be said, as in my former patent, that in some cases it is preferable that the external or exposed surfaces of the several parts be smooth as distinguished from angular or broken.

Where the wire scoring anchoring devices, as I may term them, are in the form of split rings, the ends of said rings should be spaced apart adequately to permit said rings to be compressed sufficiently to cut into the metal of the wire. The cutting depth of the split ring anchoring devices may be varied according to the depth of the grooves within the jaws $4^b$, said grooves being of such a depth as to permit only the desired projection of the wire.

While I have shown my improvement in the preferred form, obviously many changes may be made without departing from the spirit or scope of this invention.

What I claim is:

1. In a splicing sleeve for wire and the like, a main body portion, a passage therein, a screw thread in said passage, an inclined or tapered portion beyond said screw thread, a removable clamping member, a yielding clamping jaw at the inner end of said clamping member adapted to the tapered portion of the sleeve, an intermediate threaded portion on said end piece adapted to the screw threaded portion of the sleeve, anchoring means carried by the clamping jaw at its inner side arranged to score into the wire to be secured thereby.

2. In a splicing sleeve for wire and the like, a main body portion, a passage therein, a screw thread in said passage, an inclined or tapered portion beyond said screw thread, a removable clamping member, a yielding clamping jaw at the inner end of said clamping member adapted to the tapered portion of the sleeve, an intermediate threaded portion on said end piece adapted to the screw threaded portion of the sleeve, anchoring means carried by the clamping jaw at its inner side arranged to score into the wire to be secured thereby, said anchoring means comprising a split ring arranged within the jaw end of the clamping member.

3. In a splicing sleeve for wire and the like, a main body portion, a passage therein, a screw thread in said passage, an inclined or tapered portion beyond said screw thread, a removable clamping member, a yielding clamping jaw at the inner end of said clamping member adapted to the tapered portion of the sleeve, an intermediate threaded portion on said end piece adapted to the screw threaded portion of the sleeve, anchoring means carried by the clamping jaw at its inner side arranged to score into the wire to be secured thereby, said jaw end being recessed internally to carry said anchoring means, the walls of said recess preventing the displacement thereof relatively to the clamping member.

HARRY FRANKEL.

Witnesses:
 R. C. MITCHELL,
 M. E. GARRETT.